(12) United States Patent
Tsang et al.

(10) Patent No.: US 10,556,252 B2
(45) Date of Patent: Feb. 11, 2020

(54) ELECTRONIC DEVICE HAVING A TUNED RESONANCE HAPTIC ACTUATION SYSTEM

(71) Applicant: Apple Inc., Cupertino, CA (US)

(72) Inventors: Lok Pui Calvin Tsang, Suzhou (CN); Yu Chen, Suzhou (CN); Qingguo Zhao, Shanghai (CN); Weiqiang Fu, Foshan (CN); Hong Feng Wang, Suzhou (CN); Chung Yin Au, Hong Kong (CN)

(73) Assignee: APPLE INC., Cupertino, CA (US)

( * ) Notice: Subject to any disclaimer, the term of this patent is extended or adjusted under 35 U.S.C. 154(b) by 76 days.

(21) Appl. No.: 15/846,809

(22) Filed: Dec. 19, 2017

(65) Prior Publication Data

US 2019/0084005 A1 Mar. 21, 2019

Related U.S. Application Data

(60) Provisional application No. 62/561,010, filed on Sep. 20, 2017.

(51) Int. Cl.
*B06B 1/12* (2006.01)
*H05K 5/00* (2006.01)

(52) U.S. Cl.
CPC .............. *B06B 1/12* (2013.01); *H05K 5/0017* (2013.01)

(58) Field of Classification Search
CPC combination set(s) only.
See application file for complete search history.

(56) References Cited

U.S. PATENT DOCUMENTS

| 5,196,745 A | 3/1993 | Trumper et al. |
| 5,293,161 A | 3/1994 | MacDonald et al. |

(Continued)

FOREIGN PATENT DOCUMENTS

| CN | 101036105 | 9/2007 |
| CN | 101409164 | 4/2009 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

(Continued)

*Primary Examiner* — Nabil H Syed
*Assistant Examiner* — Cal J Eustaquio
(74) *Attorney, Agent, or Firm* — Brownstein, Hyatt, Farber, Schreck, LLP

(57) ABSTRACT

An electronic device includes an enclosure, a display positioned with the enclosure and defining a front face of the electronic device, and a haptic actuator positioned within the enclosure. The haptic actuator includes a housing comprising a wall and a movable mass positioned within the housing and configured to move within the housing to cause the haptic actuator to produce a vibrational response. The vibrational response includes a first component within a frequency range and a second component outside of the frequency range and providing a haptic output portion of the vibrational response. The haptic actuator also includes a tuning feature incorporated with the wall and configured to reduce the first component of the vibrational response while substantially maintaining the haptic output portion of the vibrational response.

20 Claims, 13 Drawing Sheets

(56) References Cited

U.S. PATENT DOCUMENTS

| | | | |
|---|---|---|---|
| 5,424,756 | A | 6/1995 | Ho et al. |
| 5,434,549 | A | 7/1995 | Hirabayashi et al. |
| 5,436,622 | A | 7/1995 | Gutman et al. |
| 5,668,423 | A | 9/1997 | You et al. |
| 5,842,967 | A | 1/1998 | Kroll |
| 5,739,759 | A | 4/1998 | Nakazawa et al. |
| 6,084,319 | A | 7/2000 | Kamata et al. |
| 6,342,880 | B2 | 1/2002 | Rosenberg et al. |
| 6,373,465 | B2 | 4/2002 | Jolly et al. |
| 6,388,789 | B1 | 5/2002 | Bernstein |
| 6,438,393 | B1 | 8/2002 | Surronen |
| 6,445,093 | B1 | 9/2002 | Binnard |
| 6,493,612 | B1 | 12/2002 | Bisset et al. |
| 6,693,622 | B1 | 2/2004 | Shahoian et al. |
| 6,777,895 | B2 | 8/2004 | Shimoda et al. |
| 6,822,635 | B2 | 11/2004 | Shahoian |
| 6,864,877 | B2 | 3/2005 | Braun et al. |
| 6,952,203 | B2 | 10/2005 | Banerjee et al. |
| 6,988,414 | B2 | 1/2006 | Ruhrig et al. |
| 7,068,168 | B2 | 6/2006 | Girshovich et al. |
| 7,080,271 | B2 | 7/2006 | Kardach et al. |
| 7,126,254 | B2 | 10/2006 | Nanataki et al. |
| 7,130,664 | B1 | 10/2006 | Williams |
| 7,196,688 | B2 | 3/2007 | Shena et al. |
| 7,202,851 | B2 | 4/2007 | Cunningham et al. |
| 7,234,379 | B2 | 6/2007 | Claesson et al. |
| 7,253,350 | B2 | 8/2007 | Noro et al. |
| 7,276,907 | B2 | 10/2007 | Kitagawa et al. |
| 7,323,959 | B2 | 1/2008 | Naka et al. |
| 7,339,572 | B2 | 3/2008 | Schena |
| 7,355,305 | B2 | 4/2008 | Nakamura et al. |
| 7,360,446 | B2 | 4/2008 | Dai et al. |
| 7,370,289 | B1 | 5/2008 | Ebert et al. |
| 7,392,066 | B2 | 6/2008 | Hapamas |
| 7,423,631 | B2 | 9/2008 | Shahoian et al. |
| 7,508,382 | B2 | 3/2009 | Denoue et al. |
| 7,570,254 | B2 | 8/2009 | Suzuki et al. |
| 7,656,388 | B2 | 2/2010 | Schena et al. |
| 7,667,371 | B2 | 2/2010 | Sadler et al. |
| 7,667,691 | B2 | 2/2010 | Boss et al. |
| 7,675,414 | B2 | 3/2010 | Ray |
| 7,710,397 | B2 | 5/2010 | Krah et al. |
| 7,710,399 | B2 | 5/2010 | Bruneau et al. |
| 7,741,938 | B2 | 6/2010 | Kramlich |
| 7,755,605 | B2 | 7/2010 | Daniel et al. |
| 7,798,982 | B2 | 9/2010 | Zets et al. |
| 7,825,903 | B2 | 11/2010 | Anastas et al. |
| 7,855,657 | B2 | 12/2010 | Doemens et al. |
| 7,890,863 | B2 | 2/2011 | Grant et al. |
| 7,893,922 | B2 | 2/2011 | Klinghult et al. |
| 7,904,210 | B2 | 3/2011 | Pfau et al. |
| 7,911,328 | B2 | 3/2011 | Luden et al. |
| 7,919,945 | B2 | 4/2011 | Houston et al. |
| 7,952,261 | B2 | 5/2011 | Lipton et al. |
| 7,952,566 | B2 | 5/2011 | Poupyrev et al. |
| 7,956,770 | B2 | 6/2011 | Klinghult et al. |
| 7,976,230 | B2 | 7/2011 | Ryynanen et al. |
| 8,002,089 | B2 | 8/2011 | Jasso et al. |
| 8,020,266 | B2 | 9/2011 | Ulm et al. |
| 8,040,224 | B2 | 10/2011 | Hwang |
| 8,053,688 | B2 | 11/2011 | Conzola et al. |
| 8,063,892 | B2 | 11/2011 | Shahoian |
| 8,081,156 | B2 | 12/2011 | Ruettiger |
| 8,125,453 | B2 | 2/2012 | Shahoian et al. |
| 8,154,537 | B2 | 4/2012 | Olien et al. |
| 8,174,495 | B2 | 5/2012 | Takashima et al. |
| 8,174,512 | B2 | 5/2012 | Ramstein et al. |
| 8,169,402 | B2 | 6/2012 | Shahoian et al. |
| 8,217,892 | B2 | 7/2012 | Meadors |
| 8,217,910 | B2 | 7/2012 | Stallings et al. |
| 8,232,494 | B2 | 7/2012 | Purcocks |
| 8,248,386 | B2 | 8/2012 | Harrison |
| 8,253,686 | B2 | 8/2012 | Kyung |
| 8,262,480 | B2 | 9/2012 | Cohen et al. |
| 8,265,292 | B2 | 9/2012 | Leichter |
| 8,265,308 | B2 | 9/2012 | Gitzinger et al. |
| 8,344,834 | B2 | 1/2013 | Niiyama |
| 8,345,025 | B2 | 1/2013 | Seibert et al. |
| 8,351,104 | B2 | 1/2013 | Zaifrani et al. |
| 8,378,797 | B2 | 2/2013 | Pance et al. |
| 8,378,965 | B2 | 2/2013 | Gregorio et al. |
| 8,384,316 | B2 | 2/2013 | Houston et al. |
| 8,390,218 | B2 | 3/2013 | Houston et al. |
| 8,390,594 | B2 | 3/2013 | Modarres et al. |
| 8,400,027 | B2 | 3/2013 | Dong et al. |
| 8,405,618 | B2 | 3/2013 | Colgate et al. |
| 8,421,609 | B2 | 4/2013 | Kim et al. |
| 8,469,806 | B2 | 6/2013 | Grant et al. |
| 8,471,690 | B2 | 6/2013 | Hennig et al. |
| 8,493,177 | B2 | 7/2013 | Flaherty et al. |
| 8,493,189 | B2 | 7/2013 | Suzuki |
| 8,576,171 | B2 | 11/2013 | Grant |
| 8,598,750 | B2 | 12/2013 | Park |
| 8,598,972 | B2 | 12/2013 | Cho et al. |
| 8,604,670 | B2 | 12/2013 | Mahameed et al. |
| 8,605,141 | B2 | 12/2013 | Dialameh et al. |
| 8,614,431 | B2 | 12/2013 | Huppi et al. |
| 8,619,031 | B2 | 12/2013 | Hayward |
| 8,624,448 | B2 | 1/2014 | Kaiser et al. |
| 8,633,916 | B2 | 1/2014 | Bernstein et al. |
| 8,639,485 | B2 | 1/2014 | Connacher et al. |
| 8,648,829 | B2 | 2/2014 | Shahoian et al. |
| 8,654,524 | B2 | 2/2014 | Pance et al. |
| 8,681,130 | B2 | 3/2014 | Adhikari |
| 8,717,151 | B2 | 5/2014 | Forutanpour et al. |
| 8,730,182 | B2 | 5/2014 | Modarres et al. |
| 8,749,495 | B2 | 6/2014 | Grant et al. |
| 8,754,759 | B2 | 6/2014 | Fadell et al. |
| 8,760,037 | B2 | 6/2014 | Eshed et al. |
| 8,773,247 | B2 | 7/2014 | Ullrich |
| 8,780,074 | B2 | 7/2014 | Castillo et al. |
| 8,797,153 | B2 | 8/2014 | Vanhelle et al. |
| 8,803,670 | B2 | 8/2014 | Steckel et al. |
| 8,834,390 | B2 | 9/2014 | Couvillon |
| 8,836,502 | B2 | 9/2014 | Culbert et al. |
| 8,836,643 | B2 | 9/2014 | Romera Jolliff et al. |
| 8,867,757 | B1 | 10/2014 | Ooi |
| 8,872,448 | B2 | 10/2014 | Boldyrev et al. |
| 8,878,401 | B2 | 11/2014 | Lee |
| 8,907,661 | B2 | 12/2014 | Maier et al. |
| 8,976,139 | B2 | 3/2015 | Koga et al. |
| 8,981,682 | B2 | 3/2015 | Delson et al. |
| 8,987,951 | B2 | 3/2015 | Park |
| 9,008,730 | B2 | 4/2015 | Kim et al. |
| 9,024,738 | B2 | 5/2015 | Van Schyndel et al. |
| 9,052,785 | B2 | 6/2015 | Horie |
| 9,054,605 | B2 | 6/2015 | Jung et al. |
| 9,058,077 | B2 | 6/2015 | Lazaridis et al. |
| 9,086,727 | B2 | 7/2015 | Tidemand et al. |
| 9,092,056 | B2 | 7/2015 | Myers et al. |
| 9,104,285 | B2 | 8/2015 | Colgate et al. |
| 9,122,330 | B2 | 9/2015 | Bau et al. |
| 9,134,796 | B2 | 9/2015 | Lemmons et al. |
| 9,172,669 | B2 | 10/2015 | Swink et al. |
| 9,218,727 | B2 | 12/2015 | Rothkopf et al. |
| 9,245,704 | B2 | 1/2016 | Maharjan et al. |
| 9,256,287 | B2 | 2/2016 | Shinozaki et al. |
| 9,274,601 | B2 | 3/2016 | Faubert et al. |
| 9,280,205 | B2 | 3/2016 | Rosenberg et al. |
| 9,286,907 | B2 | 3/2016 | Yang et al. |
| 9,304,587 | B2 | 4/2016 | Wright et al. |
| 9,319,150 | B2 | 4/2016 | Peeler et al. |
| 9,361,018 | B2 | 6/2016 | Pasquero et al. |
| 9,396,629 | B1 | 7/2016 | Weber et al. |
| 9,430,042 | B2 | 8/2016 | Levin |
| 9,436,280 | B2 | 9/2016 | Tartz et al. |
| 9,442,570 | B2 | 9/2016 | Slonneger |
| 9,448,713 | B2 | 9/2016 | Cruz-Hernandez et al. |
| 9,449,476 | B2 | 9/2016 | Lynn et al. |
| 9,466,783 | B2 | 10/2016 | Olien et al. |
| 9,489,049 | B2 | 11/2016 | Li |
| 9,496,777 | B2 | 11/2016 | Jung |
| 9,501,149 | B2 | 11/2016 | Burnbaum et al. |
| 9,513,704 | B2 | 12/2016 | Heubel et al. |

(56) References Cited

U.S. PATENT DOCUMENTS

| | | | |
|---|---|---|---|
| 9,535,500 | B2 | 1/2017 | Pasquero et al. |
| 9,539,164 | B2 | 1/2017 | Sanders et al. |
| 9,557,830 | B2 | 1/2017 | Grant |
| 9,557,857 | B2 | 1/2017 | Schediwy |
| 9,594,429 | B2 | 3/2017 | Bard et al. |
| 9,600,037 | B2 | 3/2017 | Pance et al. |
| 9,600,071 | B2 | 3/2017 | Rothkopf |
| 9,632,583 | B2 | 4/2017 | Virtanen et al. |
| 9,666,040 | B2 | 5/2017 | Flaherty et al. |
| 9,710,061 | B2 | 7/2017 | Pance et al. |
| 9,727,238 | B2 | 8/2017 | Peh et al. |
| 9,733,704 | B2 | 8/2017 | Cruz-Hernandez et al. |
| 9,829,981 | B1 | 11/2017 | Ji |
| 9,857,872 | B2 | 1/2018 | Terlizzi et al. |
| 9,875,625 | B2 | 1/2018 | Khoshkava et al. |
| 9,886,090 | B2 | 2/2018 | Silvanto et al. |
| 9,904,393 | B2 | 2/2018 | Frey et al. |
| 9,921,649 | B2 | 3/2018 | Grant et al. |
| 9,927,902 | B2 | 3/2018 | Burr et al. |
| 9,940,013 | B2 | 4/2018 | Choi et al. |
| 9,977,499 | B2 | 5/2018 | Westerman et al. |
| 2003/0117132 | A1 | 6/2003 | Klinghult |
| 2005/0036603 | A1 | 2/2005 | Hughes |
| 2005/0230594 | A1 | 10/2005 | Sato et al. |
| 2006/0017691 | A1 | 1/2006 | Cruz-Hernandez et al. |
| 2006/0209037 | A1 | 9/2006 | Wang et al. |
| 2006/0223547 | A1 | 10/2006 | Chin et al. |
| 2006/0252463 | A1 | 11/2006 | Liao |
| 2007/0106457 | A1 | 5/2007 | Rosenberg |
| 2007/0152974 | A1 | 7/2007 | Kim et al. |
| 2008/0062145 | A1 | 3/2008 | Shahoian |
| 2008/0084384 | A1 | 4/2008 | Gregorio et al. |
| 2008/0111791 | A1 | 5/2008 | Nikittin |
| 2009/0085879 | A1 | 4/2009 | Dai et al. |
| 2009/0115734 | A1 | 5/2009 | Fredriksson et al. |
| 2009/0166098 | A1 | 7/2009 | Sunder |
| 2009/0167702 | A1 | 7/2009 | Nurmi |
| 2009/0174672 | A1* | 7/2009 | Schmidt .................. G06F 3/016 345/173 |
| 2009/0207129 | A1 | 8/2009 | Ullrich et al. |
| 2009/0225046 | A1 | 9/2009 | Kim et al. |
| 2009/0243404 | A1 | 10/2009 | Kim et al. |
| 2009/0267892 | A1 | 10/2009 | Faubert |
| 2010/0116629 | A1 | 5/2010 | Borissov et al. |
| 2010/0225600 | A1 | 9/2010 | Dai et al. |
| 2010/0231508 | A1 | 9/2010 | Cruz-Hernandez et al. |
| 2010/0313425 | A1 | 12/2010 | Hawes |
| 2010/0328229 | A1 | 12/2010 | Weber et al. |
| 2011/0115754 | A1 | 5/2011 | Cruz-Hernandez |
| 2011/0128239 | A1 | 6/2011 | Polyakov et al. |
| 2011/0132114 | A1 | 6/2011 | Siotis |
| 2011/0205038 | A1 | 8/2011 | Drouin et al. |
| 2011/0261021 | A1 | 10/2011 | Modarres et al. |
| 2012/0038471 | A1 | 2/2012 | Kim et al. |
| 2012/0056825 | A1 | 3/2012 | Ramsay et al. |
| 2012/0062491 | A1 | 3/2012 | Coni et al. |
| 2012/0113008 | A1 | 5/2012 | Makinen et al. |
| 2012/0127071 | A1 | 5/2012 | Jitkoff et al. |
| 2012/0127088 | A1 | 5/2012 | Pance et al. |
| 2012/0235942 | A1 | 9/2012 | Shahoian |
| 2012/0327006 | A1 | 12/2012 | Israr et al. |
| 2013/0016042 | A1 | 1/2013 | Makinen et al. |
| 2013/0044049 | A1 | 2/2013 | Biggs et al. |
| 2013/0207793 | A1 | 8/2013 | Weaber et al. |
| 2014/0062948 | A1 | 3/2014 | Lee et al. |
| 2014/0125470 | A1* | 5/2014 | Rosenberg .............. F41A 17/06 340/407.2 |
| 2014/0168175 | A1 | 6/2014 | Mercea et al. |
| 2014/0340209 | A1* | 11/2014 | Lacroix .................. G06F 3/016 340/407.2 |
| 2015/0126070 | A1 | 5/2015 | Candelore |
| 2015/0130730 | A1 | 5/2015 | Harley et al. |
| 2015/0234493 | A1 | 8/2015 | Parivar et al. |
| 2015/0293592 | A1 | 10/2015 | Cheong et al. |
| 2015/0338919 | A1 | 11/2015 | Weber et al. |
| 2015/0349619 | A1 | 12/2015 | Degner et al. |
| 2016/0098107 | A1 | 4/2016 | Morrell et al. |
| 2016/0171767 | A1 | 6/2016 | Anderson et al. |
| 2016/0209979 | A1 | 7/2016 | Endo et al. |
| 2016/0293829 | A1 | 10/2016 | Maharjan et al. |
| 2016/0327911 | A1 | 11/2016 | Eim et al. |
| 2016/0328930 | A1 | 11/2016 | Weber et al. |
| 2016/0379776 | A1 | 12/2016 | Oakley |
| 2017/0003744 | A1 | 1/2017 | Bard et al. |
| 2017/0024010 | A1 | 1/2017 | Weinraub |
| 2017/0111734 | A1* | 4/2017 | Macours .................. G10L 25/84 |
| 2017/0249024 | A1 | 8/2017 | Jackson et al. |
| 2017/0285843 | A1 | 10/2017 | Roberts-Hoffman et al. |
| 2017/0337025 | A1 | 11/2017 | Finnan et al. |
| 2018/0014096 | A1 | 1/2018 | Miyoshi |
| 2018/0029078 | A1 | 2/2018 | Park et al. |
| 2018/0181204 | A1 | 6/2018 | Weinraub |
| 2018/0190085 | A1* | 7/2018 | Khoshkava .............. B06B 1/045 |
| 2018/0194229 | A1 | 7/2018 | Wachinger |

FOREIGN PATENT DOCUMENTS

| | | |
|---|---|---|
| CN | 101663104 | 3/2010 |
| CN | 101872257 | 10/2010 |
| DE | 214030 | 3/1983 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2010/129892 | 11/2010 |
| WO | WO2013/169303 | 11/2013 |
| WO | WO2014/066516 | 5/2014 |
| WO | WO2016/091944 | 6/2016 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

Stein et al., "A process chain for integrating piezoelectric transducers into aluminum die castings to generate smart lightweight structures," Results in Physics 7, pp. 2534-2539, 2017.

Author Unknown, "3D Printed Mini Haptic Actuator," Autodesk, Inc., 16 pages, 2016.

\* cited by examiner

ELECTRONIC DEVICE HAVING A TUNED RESONANCE HAPTIC ACTUATION SYSTEM

CROSS-REFERENCE TO RELATED APPLICATION(S)

This application is a nonprovisional patent application of and claims the benefit of U.S. Provisional Patent Application No. 62/561,010, filed Sep. 20, 2017 and titled "Electronic Device Having a Tuned Resonance Haptic Actuation System," the disclosure of which is hereby incorporated herein by reference in its entirety.

FIELD

Embodiments described herein relate to haptic actuators, and in particular, to haptic actuators that may be incorporated into an electronic device to provide haptic output to a user.

BACKGROUND

An electronic device can include a mechanical actuator to generate tactile sensations for a user, generally referred to as "haptic output." Haptic outputs can inform the user of a specific mode, operation, or state of the electronic device, or for any other suitable purpose. Some haptic actuators include masses that are oscillated, rotated, or otherwise moved to produce a haptic output. The movement of a mass when producing a haptic output may also produce an audible output, such as a buzzing.

SUMMARY

An electronic device includes an enclosure, a display positioned with the enclosure and defining a front face of the electronic device, and a haptic actuator positioned within the enclosure. The haptic actuator includes a housing comprising a wall, a movable mass positioned within the housing and configured to move within the housing to cause the haptic actuator to produce a vibrational response. The vibrational response includes a first component within a frequency range, and a second component outside of the frequency range and providing a haptic output portion of the vibrational response. The frequency range may be from about 1 kHz to about 5 kHz, and the second component of the vibrational response may be below about 1 kHz. The haptic actuator also includes a tuning feature incorporated with the wall and configured to reduce the first component of the vibrational response while substantially maintaining the haptic output portion of the vibrational response. The movable mass may be movably coupled to the housing via an elastic member, and the movable mass may be configured to move substantially linearly along a direction that is substantially parallel to the wall.

The tuning feature may be configured to reduce the first component of the vibrational response by about 10 dBA as compared to a haptic actuator without the tuning feature. The tuning feature may be a recess in an exterior surface of the wall of the haptic actuator. The wall may have a thickness between about 100 and about 500 microns, and the recess may have a depth between about 5 and about 10 microns.

A haptic actuator includes a housing comprising a wall and a movable mass positioned within the housing and configured to move relative to the housing to impart a force on the housing, thereby causing the haptic actuator to produce a haptic output that is part of a vibrational response of the haptic actuator. The actuator may further include a recess formed in the wall and configured to reduce an amplitude of a subset of frequencies present in the vibrational response while substantially maintaining the haptic output. The subset of frequencies may be between about 1.2 kHz and about 4.5 kHz. A first surface of the wall may face the movable mass, and the recess may be laser etched into a second surface of the wall that is opposite the first surface.

The recess may be formed in an exterior surface of the wall. The wall may define at least two additional recesses. The recess may include a first portion extending along a first direction and a second portion extending along a second direction different than the first direction.

An electronic device includes an enclosure, a display positioned with the enclosure and defining a front face of the electronic device, and a haptic actuator attached to an internal structure of the electronic device and configured to produce a vibrational response including at least an audible first component within a frequency range and a haptic second component outside of the frequency range. The haptic actuator includes a movable mass and a housing at least partially enclosing the movable mass and comprising a tuning feature configured to attenuate the audible first component of the vibrational response. The tuning feature may be configured to reduce the audible first component of the vibrational response without substantially reducing the haptic second component of the vibrational response. The audible first component may correspond to a frequency range of the vibrational response between about 1 kHz and below about 5 kHz, and the haptic second component may correspond to at least part of the vibrational response outside the audible first component.

The housing may include a wall defining an exterior surface of the housing, and the tuning feature may include a protrusion extending from the exterior surface.

The housing may include a wall defining an exterior surface of the housing, and the tuning feature may include a plate secured to the exterior surface. The plate may include or be formed from metal, and the plate may be secured to the exterior surface with an adhesive layer between the plate and the surface.

The housing may include a wall defining an exterior surface of the housing, the tuning feature may include a recess in the exterior surface, and the electronic device may further include a layer between and in contact with the exterior surface and the internal structure.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
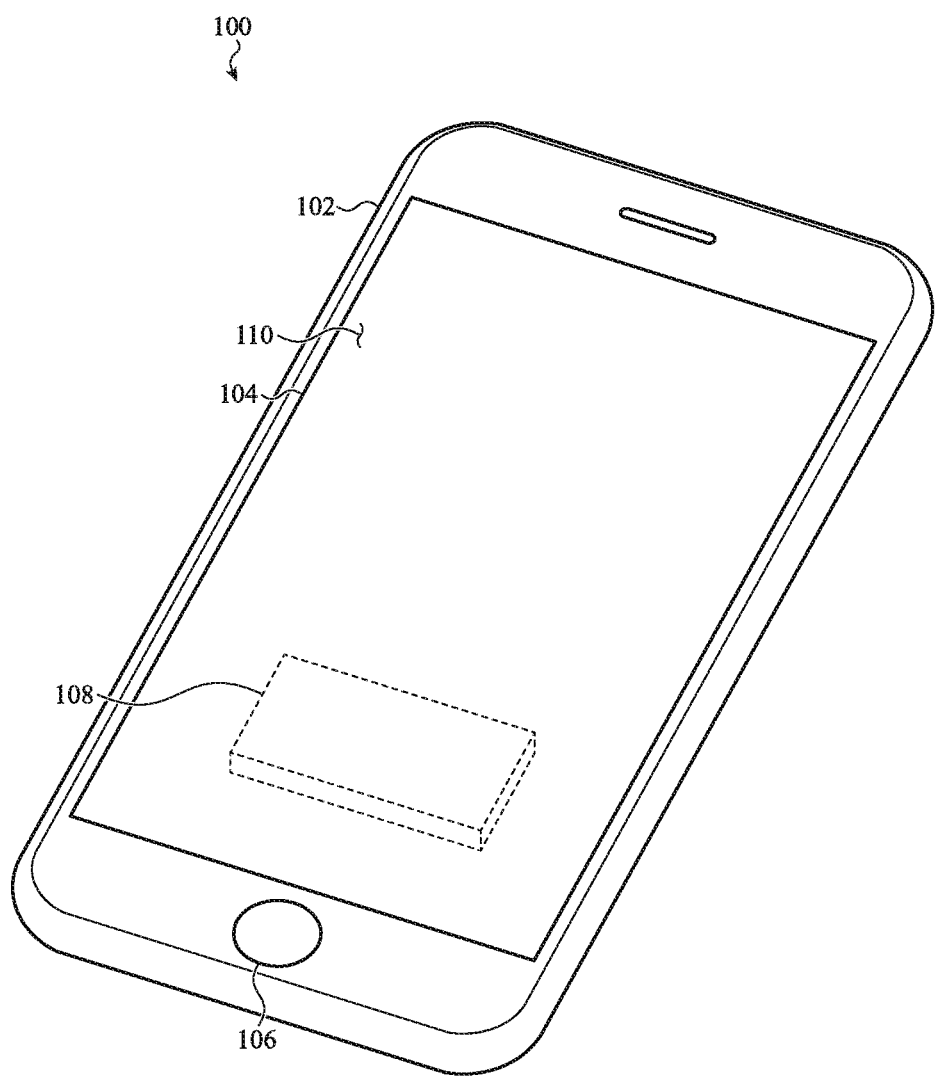
FIG. 1A depicts an electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to haptic actuators for use in electronic devices. Haptic actuators are used to produce haptic outputs, which are tactilely perceptible outputs that may be felt by a user and that may convey information to the user. For example, devices with touch screens may use haptic outputs to indicate when a user has selected (e.g., touched or pressed) an affordance on the touch screen. As another example, in devices with buttons or other input regions that do not move or do not produce tactile outputs, haptic outputs may be used to provide physical feedback indicating that the device has detected an actuation of the button or other input region. As yet another example, haptic outputs may be used to notify a user of an incoming call or message, to replace or accompany a more traditional audible notification such as a ringtone.

In some cases, haptic outputs are produced by moving a mass inside the electronic device. For example, linear actuators may move a mass along a substantially linear path, and rotary actuators or motors may spin an eccentric mass about an axis. When the mass moves, the momentum of the mass imparts forces to the electronic device that produce the haptic output (e.g., the physically or tactilely detectable output). The haptic output, however, is only one part of the overall vibrational response or output of the haptic actuator. For example, the movement of the mass may also produce audible output as a result of the resonance of the structure of the actuator itself. Thus, for example, a haptic actuator that oscillates a mass at about 150 Hz may produce a vibrational response that includes a wide range of frequency components. As used herein, a vibrational response refers to or includes mechanical waves within a medium, and may include infrasonic, audible, and ultrasonic frequencies.

In some cases, the overall vibrational response that is produced when a haptic actuator is activated (e.g., to produce a haptic output) includes undesirable sound. For example, the presence of audible noise during haptic outputs may be perceived as superfluous or annoying, as the haptic actuator may be intended to primarily provide tactile feedback, not audible feedback. For example, when a haptic output is being used to simulate a collapsing key or button (e.g., a click), a higher pitched buzz, tone, or sound accompanying the tactile output may be undesirable. As another example, in some cases, a haptic actuator is intended to be used as an alternative to audible alerts, such as to discreetly notify a user of an incoming call or email (e.g., in the case of a haptic actuator in a handheld electronic device such as a smartphone). In such cases, any resonance of the haptic actuator that results in audible output may be in conflict with the purpose of the haptic output.

Accordingly, haptic actuators as described herein may include tuning features that are configured to reduce an audible portion of a vibrational response of a haptic actuator. For example, tuning features may selectively reduce the volume of sound in a particular range of frequencies within the overall vibrational response, such as frequencies to which human hearing is particularly sensitive. These frequencies may be targeted because the increased sensitivity may cause them to be more irritating to users than other frequencies, and because small changes in the amplitude of these sounds may make a more significant difference in the perceived volume of the sounds than changes to other frequencies. Thus, configuring tuning features to reduce the audible output in a range of frequencies to which human hearing is particularly sensitive (e.g., between about 1 kHz and about 5 kHz) may help maximize the perceived reduction in volume, as compared to tuning features that are configured to reduce the volume of sound in a range of frequencies to which human hearing is less sensitive.

While it may be desirable to reduce part of the audible component of the vibrational response of the haptic actuator, it may likewise be desirable to minimize or avoid changes to other portions of the vibrational response (e.g., other frequencies outside of a particular audible range), many of which may define or contribute to the overall haptic output that is perceived by a user. For example, the overall harmonic response of the actuator, including spectral content at many different frequencies, may define what a user actually feels during a haptic output. Tuning features may therefore be configured to reduce undesirable audible content (e.g., within a particular range of frequencies), without substantially altering other portions of the vibrational response (e.g., frequencies outside the particular range and that may contribute to the overall tactile feeling of a haptic output). Accordingly, a desired haptic output can be maintained while reducing or eliminating unwanted noise.

As described herein, tuning features may be formed in, on, or otherwise incorporated with a haptic actuator. Example tuning features include recesses formed into a housing of the actuator, protrusions formed on the housing, components affixed to the housing, and the like. The tuning features may alter the structure of the housing in a way that changes how mechanical waves propagate or resonate within the material of the housing. More particularly, the tuning features may reduce the extent to which the movement of a mass results in the production of audible outputs within a particular frequency range. Examples of tuning features and their particular effect on the vibrational response of a haptic actuator are described herein.

FIG. 1A depicts an electronic device 100 that may use a haptic actuator to produce haptic outputs. The electronic device 100 is depicted as a mobile phone (e.g., a smartphone), though this is merely one example electronic device that may incorporate a haptic actuator as described herein. Accordingly, the concepts discussed herein may apply equally or by analogy to other electronic devices, including wearable electronic devices (e.g., watches, fitness trackers, biometric sensors), tablet computers, notebook computers, head-mounted displays, digital media players (e.g., mp3 players), implantable electronic devices, or the like.

The electronic device 100 includes an enclosure 102 and a cover 104, such as a glass, plastic, ceramic, or other substantially transparent material, component, or assembly, attached to the enclosure 102. The enclosure 102 may include a back and sides that cooperate to at least partially define an interior volume of the device 100.

The cover 104 may cover or otherwise overlie a display and/or a touch sensitive surface (e.g., a touchscreen), and may define a front face and an input surface 110 of the electronic device 100. For example, a user may operate the device 100 by touching the input surface 110 to select affordances displayed on the display. The electronic device 100 may also include a button 106. The button 106 may be movable, such as a mechanical push-button or key, or it may be substantially rigid. In either case, the button 106 may be used to control an operation of the device 100 or otherwise cause the device 100 to perform various functions.

The electronic device 100 may also include a haptic actuator 108 positioned within the enclosure 102. The haptic actuator 108 may produce haptic outputs that are perceived by a user of the device 100. For example, the haptic actuator 108 may provide tactile feedback in response to inputs detected on the input surface 110 (e.g., touches or presses applied to the input surface 110) and/or the button 106 (e.g., where the button 106 is rigid or does not otherwise provide tactile feedback). The haptic actuator 108 may also produce haptic outputs for other reasons, such as for notifying a user of an incoming call, email, text message, or for any other notification.

As noted above, when the haptic actuator 108 is actuated, the haptic actuator 108 may produce a vibrational response that includes a haptic component or portion that is transmitted to the user via the input surface 110 or the button 106 (or any other surface or aspect of the enclosure 102 or device 100). This same vibrational response may also include frequencies that may not significantly contribute to the tactile sensation perceived by a user, and may in fact be distracting, irritating, or an otherwise undesirable aspect of a haptic output. Accordingly, the haptic actuator 108 may include tuning features that reduce these audible frequencies of the vibrational response when the haptic actuator 108 is used to produce haptic outputs via the input surface 110, the button 106, or any other portion of the device 100.

Figure 1B:
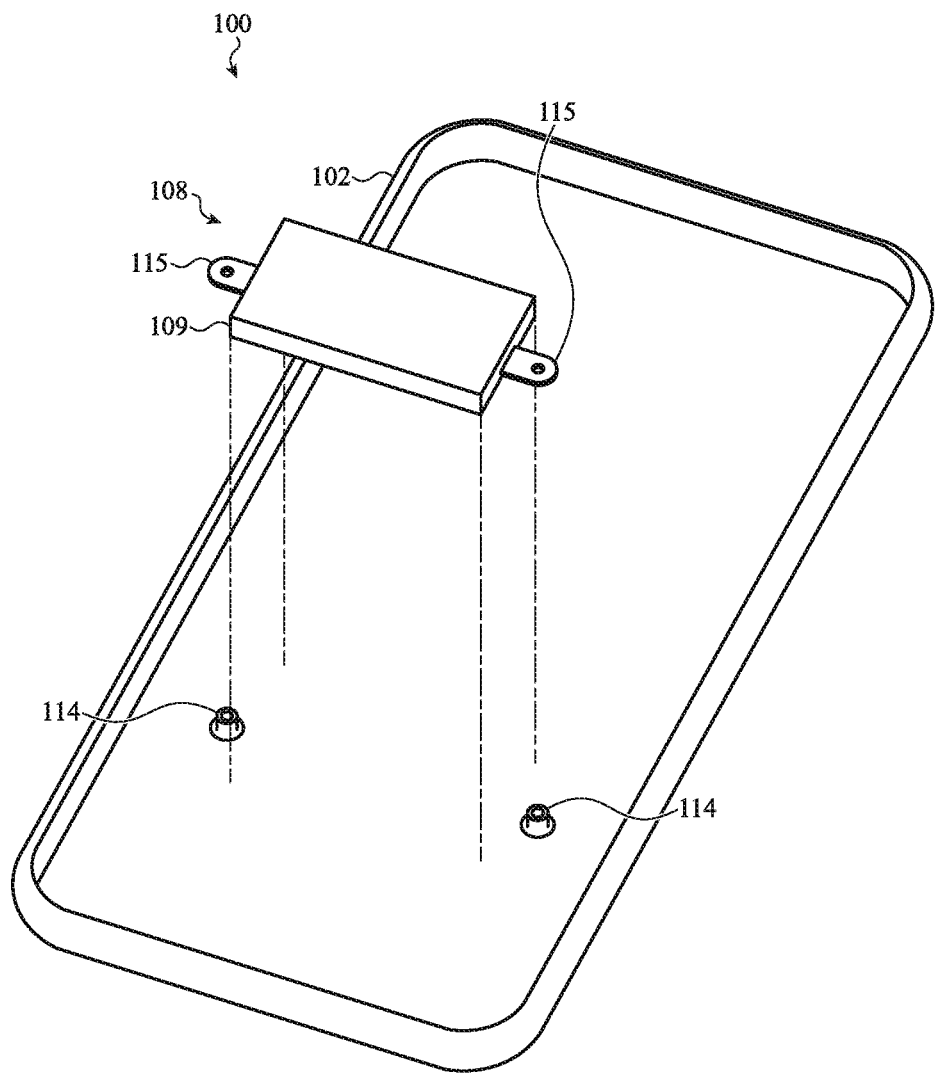
FIG. 1B depicts an exploded view of the electronic device of FIG. 1A.

FIG. 1B is an exploded view of the device 100 of FIG. 1A, showing the cover 104 and the haptic actuator 108 removed from the enclosure 102. For clarity, FIG. 1B does not show other components that may be present in the device 100, such as processors, batteries, circuit boards, sensors, cameras, switches, memory devices, and the like. Nevertheless, it will be understood that such components, as well as others not listed, may be included in an electronic device as described herein.

The haptic actuator 108 may include a housing 109 (or other structural component) and a movable mass. The movable mass (examples of which are described herein with respect to FIGS. 8A-9) may be moved within or relative to the housing 109 to produce haptic outputs. For example, the haptic actuator 108 may produce haptic outputs by moving a mass within the housing 109 substantially linearly or substantially along a single plane, according to any suitable oscillating or pulsing motion, or any other suitable motion or pattern. In another example, the haptic actuator 108 may be configured to rotate an eccentric (e.g., unbalanced) mass about an axis at one or more speeds to produce vibrations or oscillations.

The housing 109 of the haptic actuator 108 may include mounting features 115 for attaching the haptic actuator 108 to the enclosure 102. The enclosure 102 (or any other component or structure of the device 100) may include complementary mounting features 114 to which the mounting features 115 may be attached. As shown, the mounting features 115 are tabs with holes that may receive a fastener therethrough. The fastener may be anchored in the mounting features 114 of the enclosure 102 to secure the actuator 108 to the enclosure 102. Any suitable fastener may be used, such as a threaded fastener (e.g., a bolt, screw, etc.), post, clip, rivet, or the like. In some cases, a mounting feature 114 of the enclosure 102 may include a rod, shaft, or other protruding feature that is received in a hole of a mounting feature 115 of the haptic actuator 108. The rod, shaft, or other protruding feature may then be deformed to form a rivet-like head that overlaps the mounting feature 115 and secures the haptic actuator 108 to the enclosure 102 (or to any component to which the haptic actuator 108 is attached).

The haptic actuator 108 may impart forces onto the device 100 via the mounting features 114, 115, or via any other areas of physical contact between the haptic actuator 108 and the device 100. For example, when a mass inside the housing 109 is moved to produce a haptic output, momentum from the moving mass may be transmitted to the enclosure 102 via the mounting features 114, 115. In some cases, a wall or surface of the housing 109 may be in contact with an underlying surface of the enclosure 102 (or another component of the device 100), and the momentum from the haptic actuator 108 may be transmitted through the contacting surfaces. In other cases, there may be one or more layers of material between the housing 109 and the underlying surface of the enclosure 102 (or other internal component of the device 100), such as an adhesive, shim, foam pad, or the like. In such cases, the momentum from the haptic actuator 108 may be transmitted to the underlying surface or component (and ultimately to the enclosure 102) through the interstitial layer(s). In addition to the momentum from the moving mass, an entire vibrational response of the haptic actuator, including higher frequency content produced by the actuator 108, may be transmitted to the enclosure 102 via the mounting features and/or contacting surfaces between the actuator 108 and the enclosure 102.

The haptic actuator 108 may be electrically connected to other components of the device 100 to facilitate the operation of the haptic actuator 108. For example, the haptic actuator 108 may be connected to a power source (e.g., a battery) and a controller that controls various aspects of the haptic actuator 108, such as a speed, frequency, or pattern of motion of a mass of the haptic actuator 108. More particularly, a controller may control how and when electrical current is applied to electrical coils, piezoelectric materials, or other components configured to move a mass, to produce a desired haptic output. Example haptic outputs that may be produced by the haptic actuator 108 in conjunction with the controller and power source include oscillations, vibrations, pulses (e.g., non-repeating or non-cyclical movements of a mass), or the like.

Figure 2A:
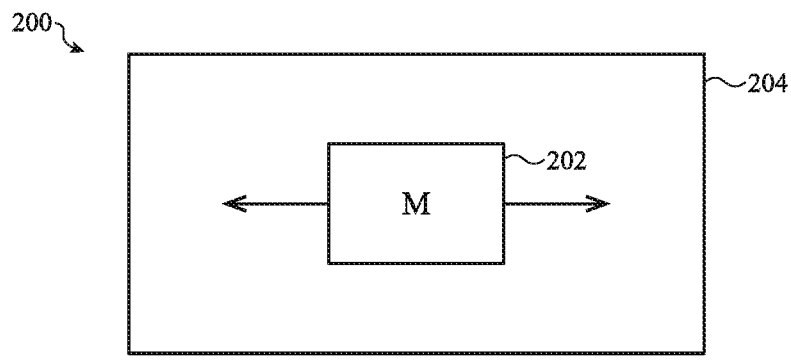
FIG. 2A depicts a schematic representation of a haptic actuator.

FIG. 2A is a schematic representation of a haptic actuator 200. The haptic actuator 200 includes a housing or frame 204, and a mass 202 that is movable relative to the housing or frame 204. While the movement of the mass 202 relative to the housing or frame 204 is represented in FIG. 2A as a linear movement, this is merely for representation and a mass may move in any suitable manner to produce haptic outputs, such as by rotating.

Figure 2B:
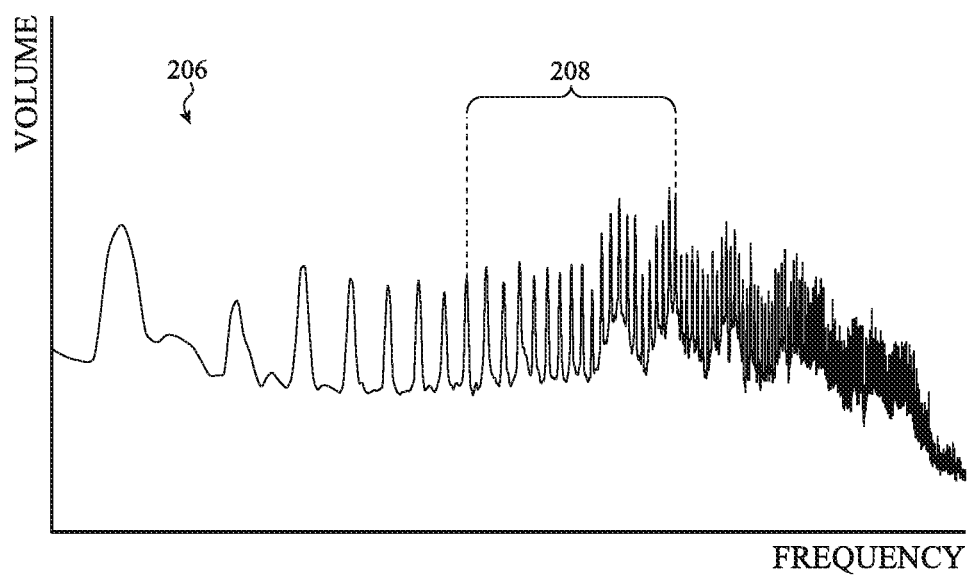
FIG. 2B depicts an example volume vs. frequency plot for a representative haptic actuator.

FIG. 2B depicts an example volume vs. frequency plot 206 of a vibrational response of a representative haptic actuator (e.g., the haptic actuator 200) while the haptic actuator is producing a haptic output. The volume axis of the plot 206 may represent a weighted or scaled representation of the volume of a sound produced by a haptic actuator. For example, the volume axis may represent an A-weighted volume of the sound, which scales the volume to account for the different sensitivity of human hearing to different frequencies. For example, human hearing has different sensitivities to sounds of different frequencies such that frequencies having equivalent sound pressure levels are not necessarily perceived as having equivalent volumes. Accordingly, the plot 206 (and in particular the volume axis) may be scaled to more accurately represent the perceived volume of certain frequencies.

The frequency axis of the plot 206 may illustrate the frequencies that may be present in a given vibrational response of a haptic actuator. As noted above, the vibrational response of a haptic actuator may include vibrational content (e.g., mechanical waves) at numerous different frequencies, which may include any frequencies including infrasonic, audible, and ultrasonic frequencies. The spectral content of a vibrational response may be the result of various mechanical properties of the haptic actuator itself, as well as other components, objects, fluids, or other materials in contact with or in proximity to the haptic actuator. For example, a mass (e.g., the mass 202) within a haptic actuator (e.g., the haptic actuator 200) may be moved or oscillated at a particular frequency (e.g., 150 Hz). Due to the mechanical properties of the actuator and the surrounding environment, the vibrational response of the actuator includes numerous additional frequencies, such as harmonics or overtones of the original oscillation frequency, as well as other frequencies that may be caused by friction between components of the actuator, resonance of the physical structures of the actuator, as well as other phenomena.

Many of the spectral components of the vibrational response of an actuator may contribute to the tactile feel of a haptic output. These spectral components may include a portion of the vibrational response that is at a frequency of oscillation or rotation of a mass of a haptic actuator, as well as other physically perceptible frequency components.

A portion of the vibrational response may also be within a particular range of audible frequencies that are aurally undesirable. This component or portion of the vibrational response, represented in FIG. 2B by the range 208, may refer to a frequency range to which human hearing is particularly sensitive. For example, the range 208 of the vibrational response shown in FIG. 2B may be between about 1 kHz and about 5 kHz, or between about 1.2 kHz and about 4.5 kHz (or any other narrower included range). While other portions of the vibrational response may be audible, the increased sensitivity of human hearing to the frequencies in this particular range may cause this portion of the vibrational response be perceived as particularly loud. Further, such sounds may be irritating or convey an impression of a low-quality or broken component or device.

As noted above, in order to reduce the volume of a haptic output, the haptic actuator may include a tuning feature that is configured to reduce the volume of a subset of the frequencies in the vibrational response. For example, the tuning feature (or tuning features) may attenuate or reduce a portion of the vibrational response that is between about 1 kHz and about 5 kHz, where human hearing is particularly sensitive. The tuning feature may also be configured so that it does not substantially reduce other frequencies or components of the vibrational response, such as frequencies that are outside of the targeted portion of the vibrational response (e.g., frequencies that are below about 1 kHz or above about 5 kHz). Accordingly, the tuning feature can act as a notch filter or a band-stop filter for the vibrational response, reducing unwanted audible output and maintaining other frequencies so that the overall haptic output remains substantially unchanged.

Figure 3A:
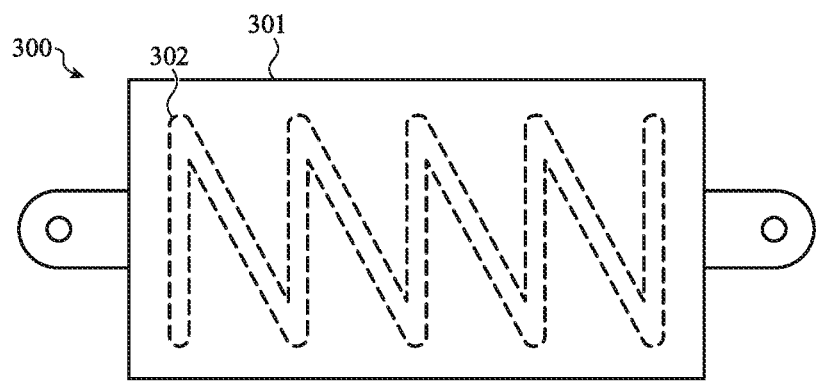
FIG. 3A depicts an example haptic actuator with a physical feature affecting audible output of the actuator.

FIG. 3A depicts an example haptic actuator 300 with a tuning feature 302, which may be configured to reduce a subset of the audible frequencies of the vibrational response of the haptic actuator 300. The tuning feature 302 may be any suitable feature, such as a recess, protrusion, plate, hole, pattern, or the like. The tuning feature 302 may change the mechanical properties of a housing 301 of the actuator 300 so that audible output within a particular frequency band is attenuated. The tuning feature 302 may change the stiffness or rigidity (or any other suitable property) of the housing 301, and thus may change how mechanical waves propagate and/or resonate through the material of the housing 301. For example, the tuning feature 302 may change a resonant frequency of the housing 301.

Figure 3B:
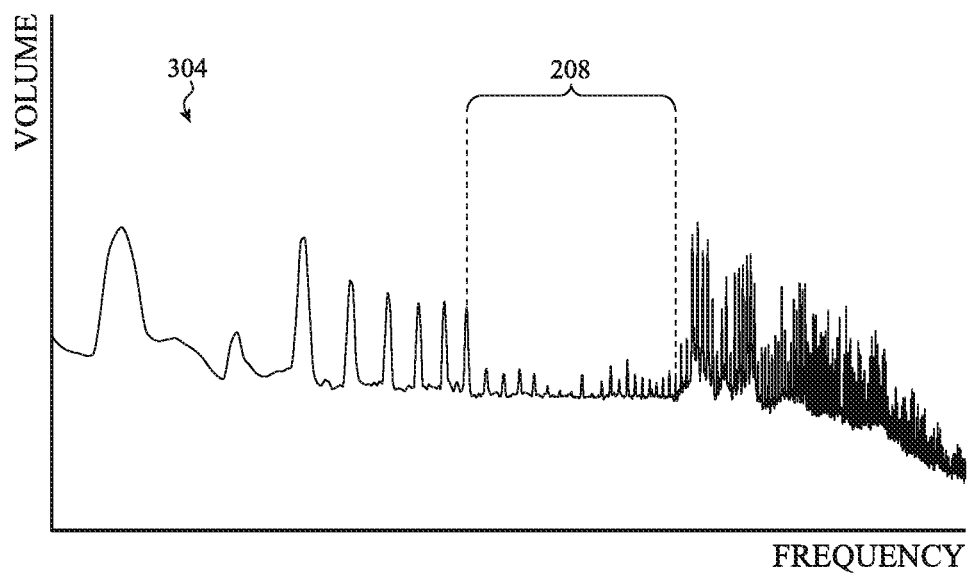
FIG. 3B depicts an example volume vs. frequency plot for the haptic actuator of FIG. 3A.

FIG. 3B depicts an example volume vs. frequency plot 304 of a vibrational response of the haptic actuator 300 while the haptic actuator 300 is producing a haptic output. Like the plot in FIG. 2B, the volume axis of the plot in FIG. 3B may represent a weighted or scaled representation of the volume of a sound produced by the haptic actuator, such as an A-weighted volume of the sound produced by a haptic actuator. However, the plot 304 includes an attenuated output in the component of the vibrational response within the range 208. In particular, the A-weighted volume of the frequencies in the range 208 may be reduced, while the A-weighted volume (as well as other properties or values) of the other components of the vibrational output (e.g., outside the range 208) are substantially unchanged. For example, the vibrational response of the actuator 300 outside of the 1 kHz to 5 kHz range may be substantially unchanged as compared to an actuator without the tuning feature. In some cases, the tuning feature 302 reduces the volume of the frequencies within the range 208 by about 10 dBA (A-weighted decibels) as compared to a haptic actuator without the tuning feature. In some cases, the volume is reduced by about 8 dBA, 9 dBA, 11 dBA, 12 dBA, or any other suitable value. In some cases, the frequencies of the vibrational response outside of the range 208 may be attenuated by less than about 0.5 dBA, 1 dBA, 2 dBA, or 5 dBA (individually and/or on average), despite the presence of the tuning feature and the attenuation of the targeted frequency range.

A haptic actuator with a tuning feature that reduces the amplitude of frequencies within a particular frequency range results in an actuator that is quieter but that still produces haptic outputs with substantially the same tactile feel. This may be particularly useful when a desired haptic output from a haptic actuator produces too much noise in a particular frequency band, as the tuning feature can reduce the unwanted noise without substantially changing the tactile feel of the desired haptic output.

The tuning feature 302 is shown as a zig-zag or "N" shaped feature (e.g., a protrusion or recess) on a surface of the housing of the haptic actuator 300. However, this configuration is representative of any suitable tuning feature that may produce the attenuation of the targeted frequencies of the vibrational response. Other examples of tuning features that may produce the attenuation represented in FIG. 3B are described herein with respect to FIGS. 4A-7B and 9.

Figure 4A:
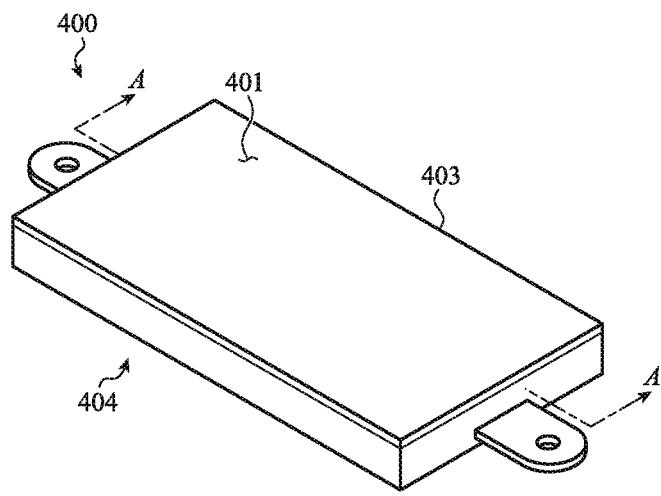
FIGS. 4A-4E depict an example haptic actuator with recesses formed in a wall.

FIG. 4A depicts an example haptic actuator (or simply "actuator") 400 that includes a tuning feature. In particular, the actuator 400 includes a housing 403 having a first exterior surface 401 and a second exterior surface 404. The actuator 400 may be configured to be installed in a device such that that the second exterior surface 404 is facing or is in contact with an internal structure or component of the device (e.g., a circuit board, enclosure, battery, mounting layer, or other component inside an electronic device). The second exterior surface 404 may be in contact with another component, or it may be separated from another component by a gap (e.g., an air gap). Where the second exterior surface 404 is in contact with another component, mechanical waves or vibrations may propagate from the housing 403 to the other component via the interface between the second exterior surface 404 and the other component. In this way, the component in contact with the housing 403 (as well as other components to which mechanical waves may propagate from the housing 403) may amplify or transmit portions of the vibrational response, which may make the component of the vibrational response within a range of high human sensitivity more prominent. Accordingly, positioning the tuning feature on this surface may aid in reducing the overall audible output of the haptic actuator as perceived by a user of the device.

Figure 4B:
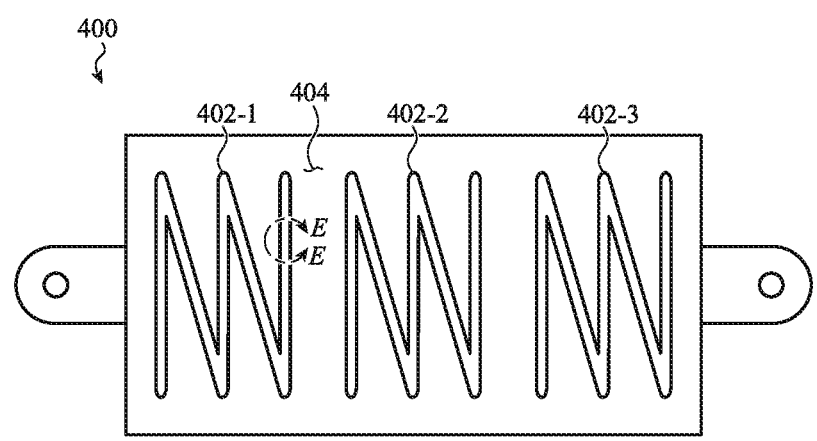
Figure 4C:
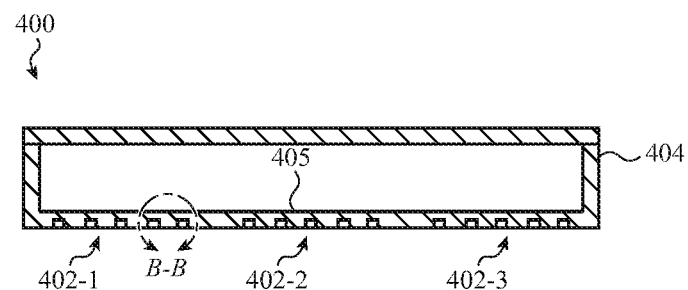

FIG. 4B depicts the second exterior surface 404 (also referred to as a bottom surface) of the haptic actuator 400, and FIG. 4C depicts a partial cross-sectional view of the actuator 400 viewed along line A-A in FIG. 4B (with internal components such as a movable mass omitted for clarity). As shown in FIGS. 4B-4C, the bottom surface 404 of the actuator 400 (e.g., the exterior surface of a bottom wall 405) includes tuning features 402 (including tuning features 402-1, . . . , 402-n). The tuning features 402 are channels or recesses formed into the bottom surface 404 and having a zig-zag or "N" shaped pattern. For example, the channels may have a first portion (e.g., corresponding to one leg of the "N" shaped pattern) extending along one direction, and a second portion (e.g., corresponding to a second leg of the "N" shaped pattern) extending along a different direction than the first portion. As shown in FIG. 4B, there are three discrete tuning features 402. In some cases, a single, continuous channel or recess having a zig-zag pattern (e.g., including several linear portions extending along different directions) may be used.

The pattern and positioning of the tuning features 402 may be configured to disrupt the propagation, resonance, and/or amplification of certain mechanical waves within the housing 403, and in particular within the bottom surface 404. For example, the positioning of the three tuning features 402-1, 402-2, and 402-3 at even intervals along a longitudinal axis of the housing 403 may provide a desired attenuation of a particular frequency band. The tuning features 402 may cause the attenuation by changing the stiffness of the housing, by increasing the resistance to the propagation of mechanical waves or vibrations through the housing material, or via other phenomena. For example, the discontinuities in the surface of the bottom wall 405 may impede mechanical waves within the material, making it more difficult for the waves (e.g., vibrations) within a particular frequency band to propagate or resonate in the material. The discontinuities may also change a fundamental frequency of the housing 403 (or the bottom wall 405), resulting in a different vibrational response during a haptic output as compared to a housing without the tuning features.

Figure 4D:
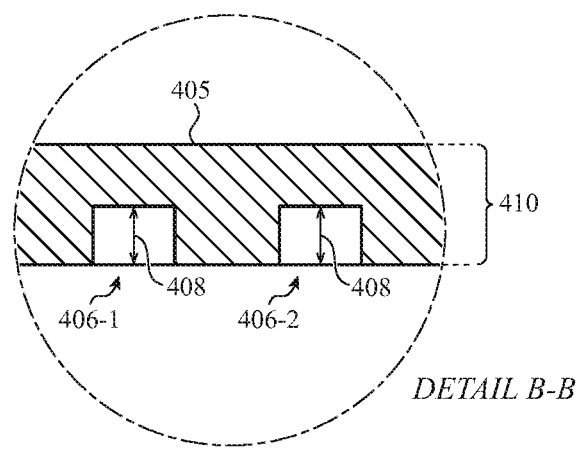

FIG. 4D shows a portion of the actuator 400 corresponding to detail B-B in FIG. 4C, showing details of recesses 406-1, 406-2 of a tuning feature 402. Like the zig-zag pattern of the tuning feature 402, the shape and dimensions of the recesses 406 may also contribute to the effectiveness of the tuning feature 402 in reducing the volume of certain audible frequencies. For example, in some cases, the recesses 406 have a depth 408 that is between about 1 and about 50 microns, or between about 5 and about 20 microns, or between about 5 and about 10 microns. In a wall 405 having a thickness 410 that is between about 100 and about 500 microns, the recesses 406 having a depth within these ranges may produce a desired attenuation (e.g., an attenuation of about 8-12 dBA in a frequency range between about 1-5 kHz or about 1.2-4.5 kHz), and may attenuate other frequencies less than about 5 dBA. The recesses 406 may have a width 416 (FIG. 4D) between about 100 microns and 2.0 mm.

Figure 4E:
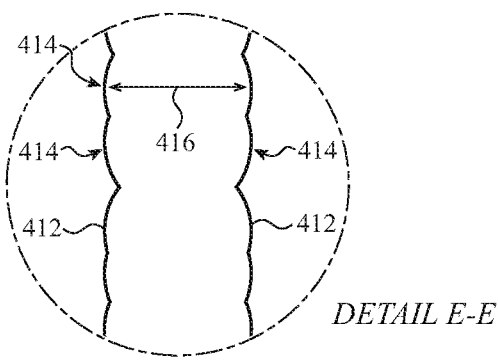

The tuning features 402 may be formed by any suitable technique. For example, the tuning features 402 may be formed by machining, laser etching, chemical etching, plasma etching, or any other suitable technique. In a laser etching process, a laser may be used to form a recess (e.g., a channel) having a particular width. For example, the laser may produce a beam having a particular spot size (corresponding to the desired width), which may be directed on the wall 405 and pulsed as the beam is translated along the path of the recess. The process of translating the beam while pulsing the beam ablates material from the wall 405 to form the recess. Further, the channel produced by the laser etching process may be defined by opposing sidewalls that have a scalloped shape. For example, FIG. 4E shows a portion of the actuator 400 corresponding to detail E-E in FIG. 4B. The recess 406 (corresponding to the tuning feature 402-1) has opposing sidewalls 412, each having a scalloped surface. In particular, the sidewalls 412 may include or be defined by rounded segments 414 that may be artifacts of the size and shape of the laser beam (which may be substantially circular) as the beam is pulsed to ablate the material and form the recess 402-1.

FIGS. 4A-4D show tuning features that are recesses in a wall of the housing. In other cases, tuning features may be protrusions instead of recesses. FIGS. 5A-5D, discussed below, depict an example haptic actuator 500 having tuning features 502 that are or include protrusions or protruding structures.

Figure 5A:
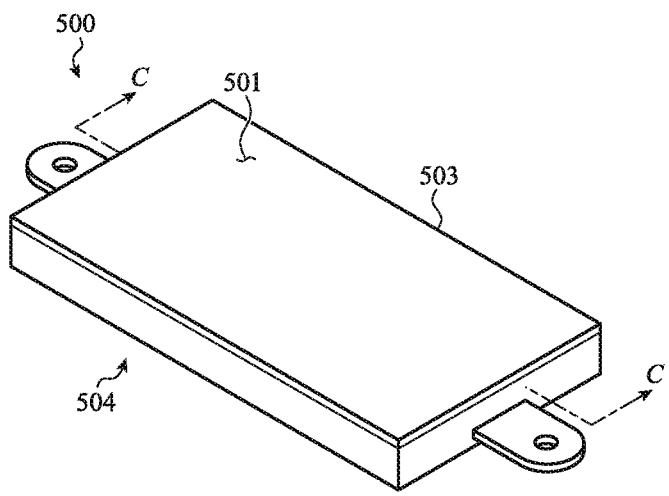
FIGS. 5A-5D depict an example haptic actuator with protrusions formed on a wall.

FIG. 5A depicts an example haptic actuator (or simply "actuator") 500 that includes a housing 503 having a first exterior surface 501 and a second exterior surface 504. Similar to the actuator 400, the actuator 500 may be configured to be installed in a device such that the second exterior surface 504 is facing or in contact with an internal structure or component of the device (e.g., a circuit board, enclosure, battery, mounting layer, or other component inside an electronic device). Mechanical waves may propagate from the housing 503 to another component of a device as described above with respect to FIG. 4A.

Figure 5B:
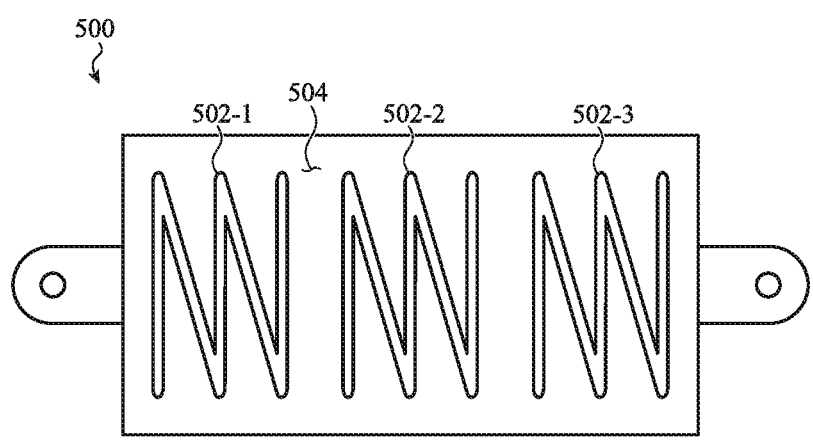
Figure 5C:
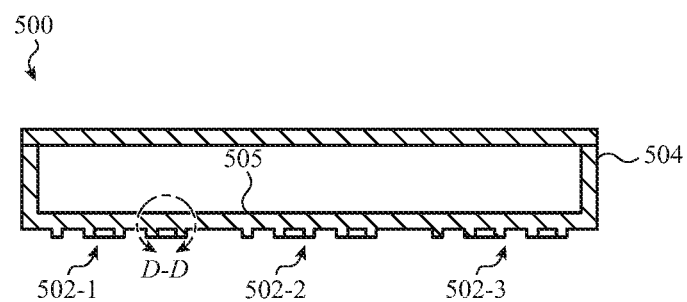

FIG. 5B depicts the second exterior surface 504 (also referred to as a bottom surface) of the haptic actuator 500, and FIG. 5C depicts a partial cross-sectional view of the actuator 500 viewed along line C-C in FIG. 5B (with internal components such as a movable mass omitted for clarity). As shown in FIGS. 5B-5C, the bottom surface 504 of the actuator 500 (e.g., the exterior surface of a bottom wall 505) includes tuning features 502 (including tuning features 502-1, . . . , 502-n). The tuning features 502 are protrusions formed on the bottom surface 504 and having a zig-zag or "N" shaped pattern. As shown in FIG. 5B, the actuator 500 includes three discrete tuning features 502. In some cases, a single, continuous protrusion or rib having a zig-zag pattern may be used.

The tuning features 502 may function in substantially the same way as the tuning feature 402. For example, the pattern and positioning of the tuning features 502 may be configured to disrupt the propagation, resonance, and/or amplification of certain mechanical waves or vibrations within the housing 503, and in particular within the bottom surface 504. For example, the positioning of the three tuning features 502-1, 502-2, and 502-3 at even intervals along a longitudinal axis of the housing 503 may provide a desired attenuation of a particular frequency band within the vibrational response of the actuator 500, without substantially attenuating other frequencies. The tuning features 502 may cause the attenuation by changing the stiffness of the housing, by increasing the resistance to the propagation of mechanical waves or vibrations through the housing material, or via other phenomena. For example, the discontinuities in the surface of the bottom wall 505 may impede mechanical waves within the material, making it more difficult for mechanical waves within a particular frequency band to propagate or resonate in the material. The discontinuities may also change a fundamental frequency of the housing 503 (or the bottom wall 505), resulting in a vibrational response having a different vibrational response during a haptic output as compared to a housing without the tuning features.

Figure 5D:
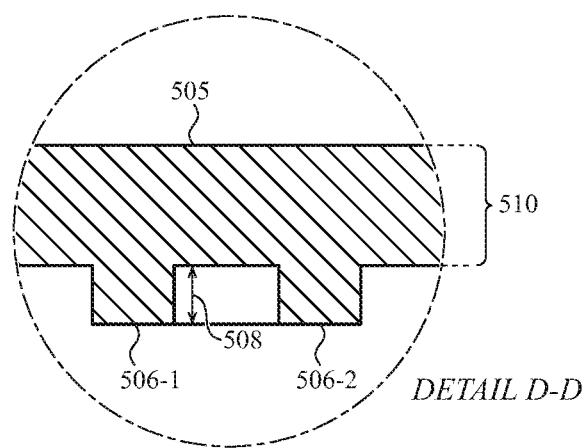

FIG. 5D shows a portion of the actuator 500 corresponding to detail D-D in FIG. 5C, showing details of protrusions 506-1, 506-2 of a tuning feature 502. Instead of the recesses of the tuning features 402, the tuning features 502 include protrusions 506, such as raised wall features. The protrusions may have any suitable height 508 above a base surface of the bottom wall 505, such as between about 10 and about 100 microns, while the wall 505 may have a thickness 510 that is between about 100 and about 500 microns.

The protrusions 506 may be formed in any suitable way. For example, the protrusions 506 may be formed by machining or etching (e.g., laser, plasma, or chemical etching) material from the wall 505 to produce the protrusions 506 and a base surface that is relieved relative to the protrusions 506. Alternatively, the protrusions 506 may be formed by physical vapor deposition, chemical vapor deposition, welding, additive manufacturing, or any other suitable technique.

FIGS. 6A-6E depict additional example tuning features that may be used to selectively reduce a component of a vibrational response within a particular frequency band or range. Any of the tuning features shown and described with respect to FIGS. 6A-6E may be formed as recesses (similar to the tuning features 402 described with respect to FIGS. 4A-4D) or protrusions (similar to the tuning features 502 described with respect to FIGS. 5A-5D), and may have similar dimensions and may be formed in similar manners to the tuning features 402, 502.

Figure 6A:
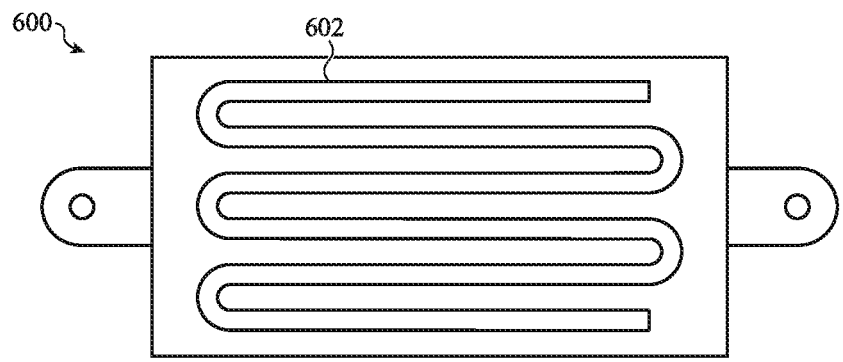
FIGS. 6A-6E depict example configurations of physical features affecting audible output of an actuator.

FIG. 6A depicts an actuator 600 with a single, serpentine tuning feature 602. The tuning feature 602 may be a single, continuous feature that extends over substantially an entire surface of the actuator 600 (e.g., substantially edge-to-edge).

Figure 6B:
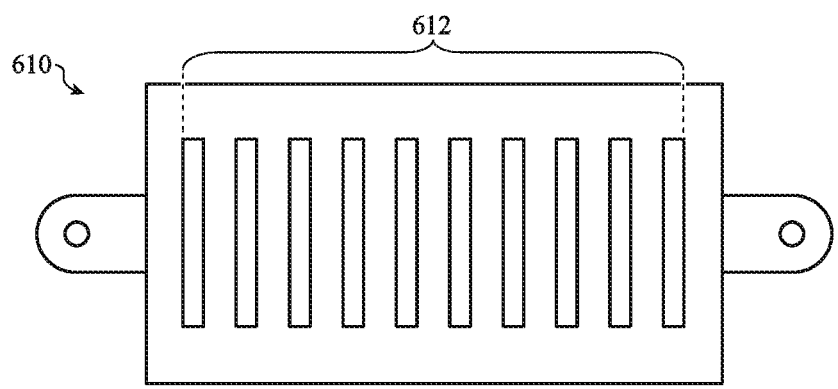

FIG. 6B depicts an actuator 610 with a series of substantially parallel, linear tuning features 612. As shown, the tuning features 612 may extend along a direction that is perpendicular to a longitudinal axis (e.g., left-to-right as shown in FIG. 6B) of the actuator 610. In cases where the actuator 610 is a linear actuator, the tuning features 612 may each extend substantially perpendicularly to an axis or direction of motion of a mass that is positioned within the actuator 610. In some cases, the tuning features 612 may be oriented at an oblique angle relative to a longitudinal axis (or an axis or direction of motion of a mass), such as about 10, 20, 30, 45, or 60 degrees from the longitudinal axis. While FIG. 6B shows ten separate parallel tuning features 612, any number of tuning features 612 may be used, and they may be spaced apart in any suitable configuration. For example, the tuning features 612 may be evenly spaced (as shown), or they may be separated into multiple groups with each group having a first spacing between features and each group being spaced apart from an adjacent group by a second different spacing. Alternatively, the tuning features may be spaced differently, such as with irregular spacing.

Figure 6C:
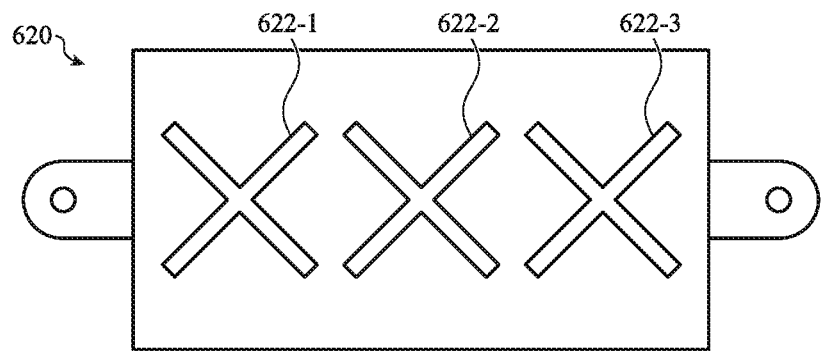

FIG. 6C depicts an actuator 620 with three x-shaped tuning features 622-1, 622-2, and 622-3. The x-shaped tuning features may include a first portion (e.g., corresponding to one leg of the x-shaped pattern) extending along one direction, and a second portion (e.g., corresponding to a second leg of the x-shaped pattern) extending along a different direction than the first portion. The tuning features 622 may be positioned substantially in-line along a longitudinal axis of the actuator 620. As shown, the tuning features 622 are physically separate features, though in other cases they may be a single continuous feature (e.g., the terminal ends of adjacent legs of adjacent features may be joined to form a continuous channel or rib).

Figure 6D:
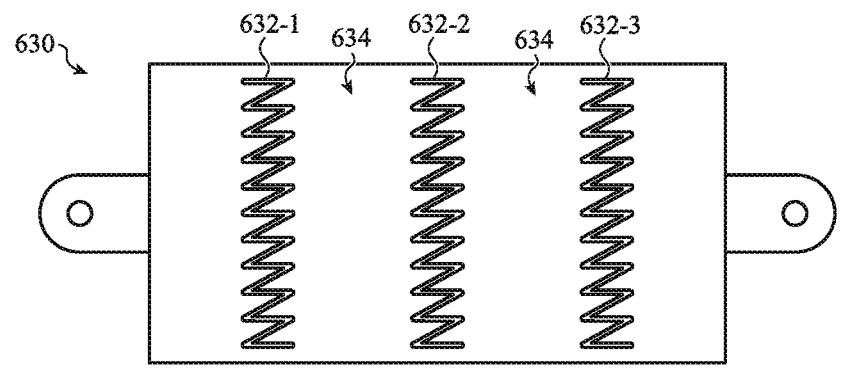

FIG. 6D depicts an actuator 630 with three tuning features 632-1, 632-2, and 632-3 each having a zig-zag shape. The tuning features 632 are shown rotated 90 degrees as compared to the tuning features 402, 502. More particularly, the zig-zag shaped tuning features 632 are shown extending along an axis that is substantially perpendicular (e.g., 90 degrees) to the longitudinal axis of the actuator 630. In other examples, the tuning features may be oriented along a different angle relative to the longitudinal axis, such as 60, 45, or 30 degrees, or any other suitable angle. As shown, the tuning features 632 are separated from one another by a space 634. This space may be any suitable size or dimension. For example, the space may be about 1, 2, or 3 times the width of the tuning features themselves. In other cases, the space may be less than a width of a tuning feature. The particular dimensions of the tuning feature and the space between adjacent tuning features may be selected to produce a desired attenuation of mechanical waves within the housing of the actuator 630 (e.g., to attenuate frequencies between about 1 kHz and about 5 kHz).

Figure 6E:
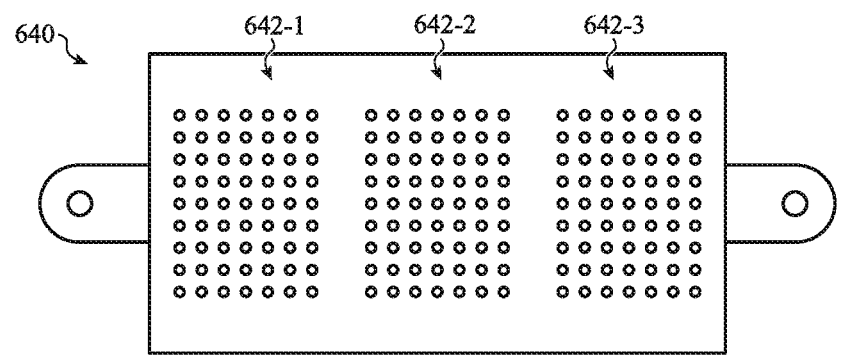

FIG. 6E depicts an actuator 640 with tuning features 642-1, 642-2, and 642-3, each composed of a group of recesses, through-holes, or protrusions (e.g., posts, bosses, or the like). The recesses or protrusions of the features 642 are arranged in a regular pattern or array (e.g., a grid), though other shapes and arrangements of the recesses or protrusions are also contemplated (e.g., recesses or protrusions arranged to form circles, x-shapes, zig-zags, squares, or the like).

While the tuning features described above are shown on a bottom exterior surface of a housing, they may also or instead be positioned on other surfaces or portions of an actuator housing. For example, they may be positioned on an inward or interior facing surface of the bottom wall of an actuator housing. Additionally or alternatively, they may be positioned on an exterior or interior surface of a top wall or side of the actuator housing. In some actuator configurations, they may be positioned on other components or portions of the actuator, such that the vibrational response is attenuated within a particular range of audible frequencies, without substantially attenuating other frequencies.

Figure 7A:
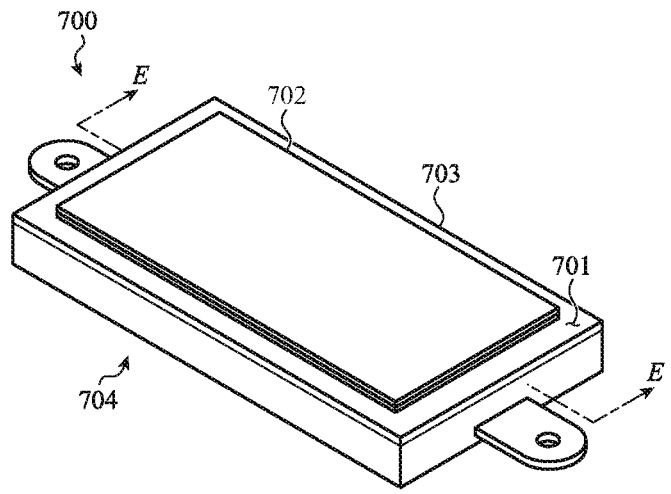
FIGS. 7A-7B depict an example haptic actuator with a plate for affecting audible output of the actuator.
Figure 7B:
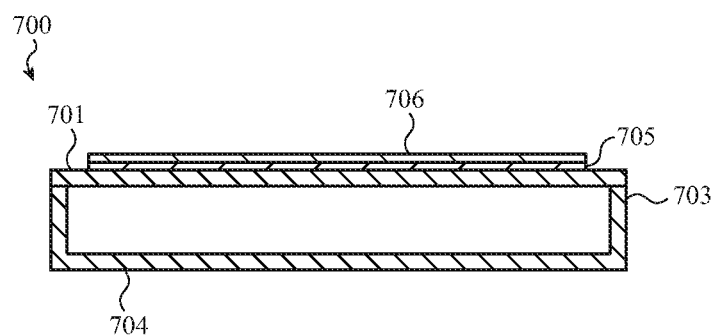

FIGS. 7A-7B depict perspective and partial cross-sectional views, respectively, of a haptic actuator 700 having a tuning feature 702 in the form of a plate 706 (FIG. 7B) that is secured to a housing 703 of the actuator 700. The tuning feature 702 may function to attenuate or reduce the volume of frequencies within a particular band, similar to the tuning features described above with respect to FIGS. 4A-6E. For example, the tuning feature 702 may add mass to the actuator 700, which may change a fundamental frequency of the housing 703 (or a wall of the housing 703) and thus may selectively reduce the volume of a portion of the vibrational response of the actuator 700 within a particular frequency range.

The tuning feature 702 may include a plate 706. The plate 706 may be formed of any suitable material, such as plastic, metal, glass, ceramic, or the like. The plate 706 may be configured to have a particular physical property, such as stiffness, density, mass, outer dimension, or the like, to have a desired effect on the vibrational response of the actuator 700. For example, the mass of the plate 706 may be selected such that the vibrational response of the actuator 700 is attenuated within a particular frequency band (e.g., between about 1 kHz and about 5 kHz or any range therein) as compared to the actuator without the plate 706. In some embodiments, the plate 706 may be formed from steel, aluminum, tungsten, copper, or the like. Where the plate 706 is conductive, it may also form a shield that reduces electromagnetic interference from or to the actuator 700.

The plate 706 may be positioned on any surface of the actuator 700. As shown, the actuator 700 includes a first (e.g., a top) surface 701 and a second (e.g., bottom) surface 704 that is opposite the first surface 701. As shown in FIGS. 7A-7B, the plate 706 is positioned on the first surface 701, though this is merely one example configuration, and the plate may be positioned on the second surface 704. In some cases, multiple plates are used, with one or more plates on each of the first and second surfaces 701, 704 (and optionally one or more plates on any of the side surfaces of the actuator 700).

In some cases, when the actuator 700 is incorporated in an electronic device (e.g., a smart phone), the plate 706 is in contact with another component or structure of the device, such as a circuit board, a battery, a mounting feature of an enclosure of the device, a display component, or the like. Also, the plate 706 may be arranged in a device such that, when the device is dismantled (e.g., for repair), the plate 706 is visible without removal of the actuator 700 from the device. In such cases, the plate 706 may include readable information, such as a serial number, logo, device name, or any other suitable information. When readable information is included on the plate 706, it may be applied or incorporated in any suitable way, such as via engraving, etching, ink or paint deposition, anodizing, additional labels, or the like.

The plate 706 may be attached to the housing 703 via an adhesive layer 705. The adhesive layer 705 may be any suitable adhesive, such as a pressure or heat sensitive adhesive, epoxy, cyanoacrylate, or the like. The physical properties (e.g., stiffness, elasticity, bond strength, thickness, application pattern, etc.) of the adhesive layer 705 may be configured or selected to further improve attenuation of frequencies within a desired frequency band. In some cases, however, the adhesive layer 705 may be substantially inconsequential to the performance of the plate 706 as a tuning feature. For example, the adhesive layer 705 may be sufficiently thin that the effect of the adhesive layer 705 on the vibrational response of the actuator 700 may be negligible. Instead of or in addition to an adhesive layer, the plate 706 may be attached by welding, soldering, brazing, or any other suitable process or component.

Figure 8A:
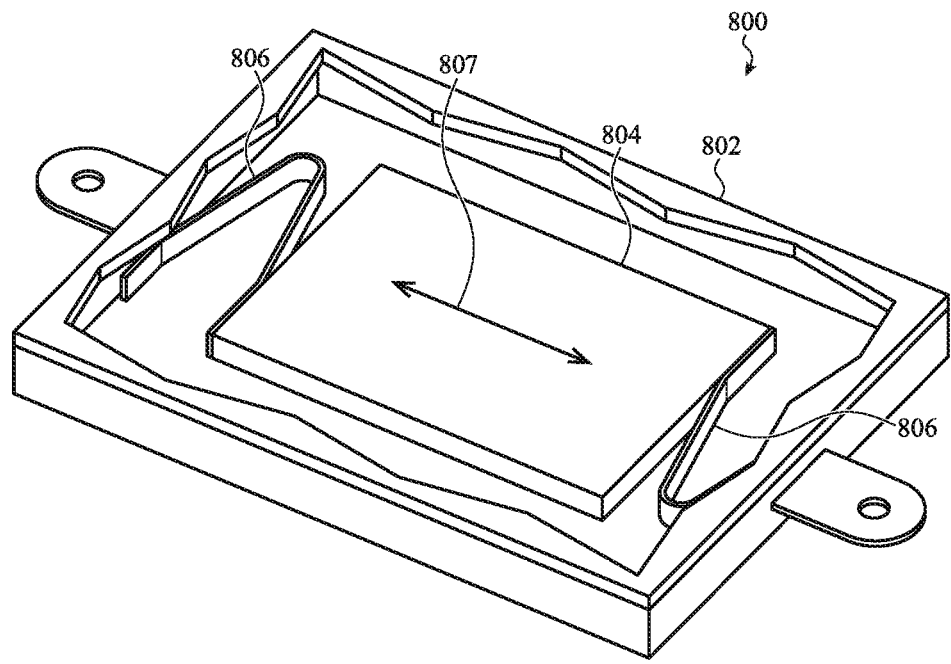
FIGS. 8A-8B depict example configurations of a linear haptic actuator.
Figure 8B:
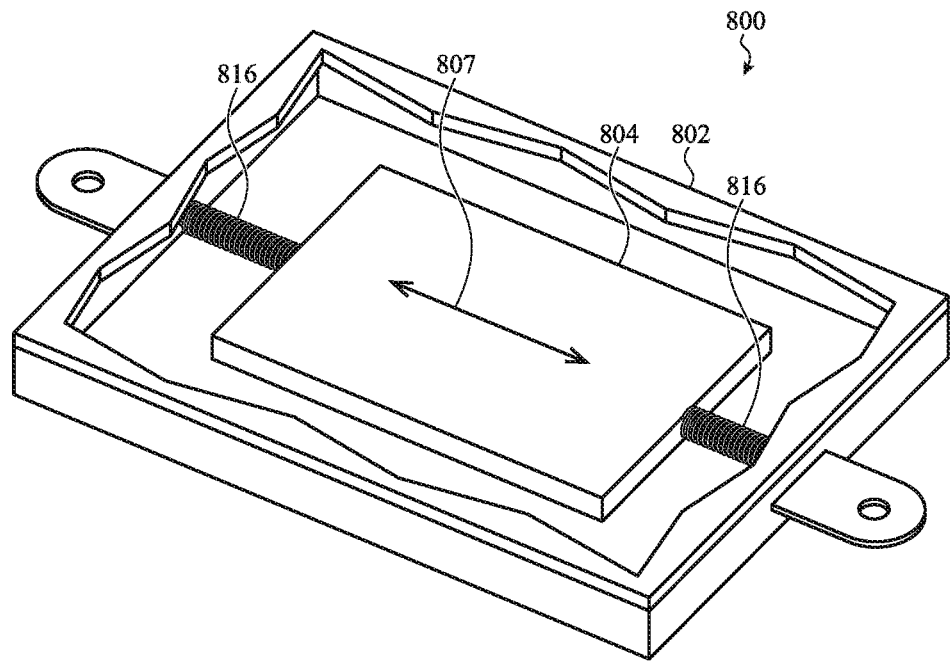

FIGS. 8A and 8B depict partial cut-away views of example haptic actuators, showing several example arrangements of movable masses and elastic members that movably couple the masses to the housing. For example, FIG. 8A depicts a haptic actuator 800 that includes a housing 802, with a movable mass 804 movably coupled within the interior of the housing 802 via elastic members 806. The elastic members 806 are configured as a substantially flat (e.g., ribbon shaped) spring that is formed into a curved or bent configuration. The elastic members 806 deflect or deform when the mass 804 is moved within the housing 802 (e.g., along a direction of motion 807), and, when deflected or deformed, they impart a force to the mass 804 to return the mass 804 to a central or neutral position.

Similarly, FIG. 8B depicts a haptic actuator 810 that includes a housing 802, with a movable mass 814 movably coupled within the interior of the housing 812 via elastic members 816. In the example actuator 810, the elastic members are coil springs that deflect or deform when the mass 814 is moved within the housing 812 (e.g., along a direction of motion 817).

The haptic actuators 800, 810 in FIGS. 8A-8B may also include other components and features, such as electrical coils, magnets, structural guides and/or supports, and the like. Structural guides and/or supports may help support the masses relative to the housing and may guide the masses so that they move substantially along a linear direction or substantially within a particular plane. Coils, magnets, and the like may be used to cause the masses to move relative to the housings, for example, by selectively energizing coils to produce a motive force on the masses. The motion of the masses 804, 814, including the forces applied to the housing via the elastic members 806, 816, friction between the masses and support members, resonance of the elastic members, etc., may contribute to the overall vibrational response of the haptic actuator, and thus may ultimately produce undesirable audible output. The haptic actuators 800, 810 may therefore use tuning features such as those described above to reduce or attenuate a portion of the vibrational response having particular audible content.

Figure 9:
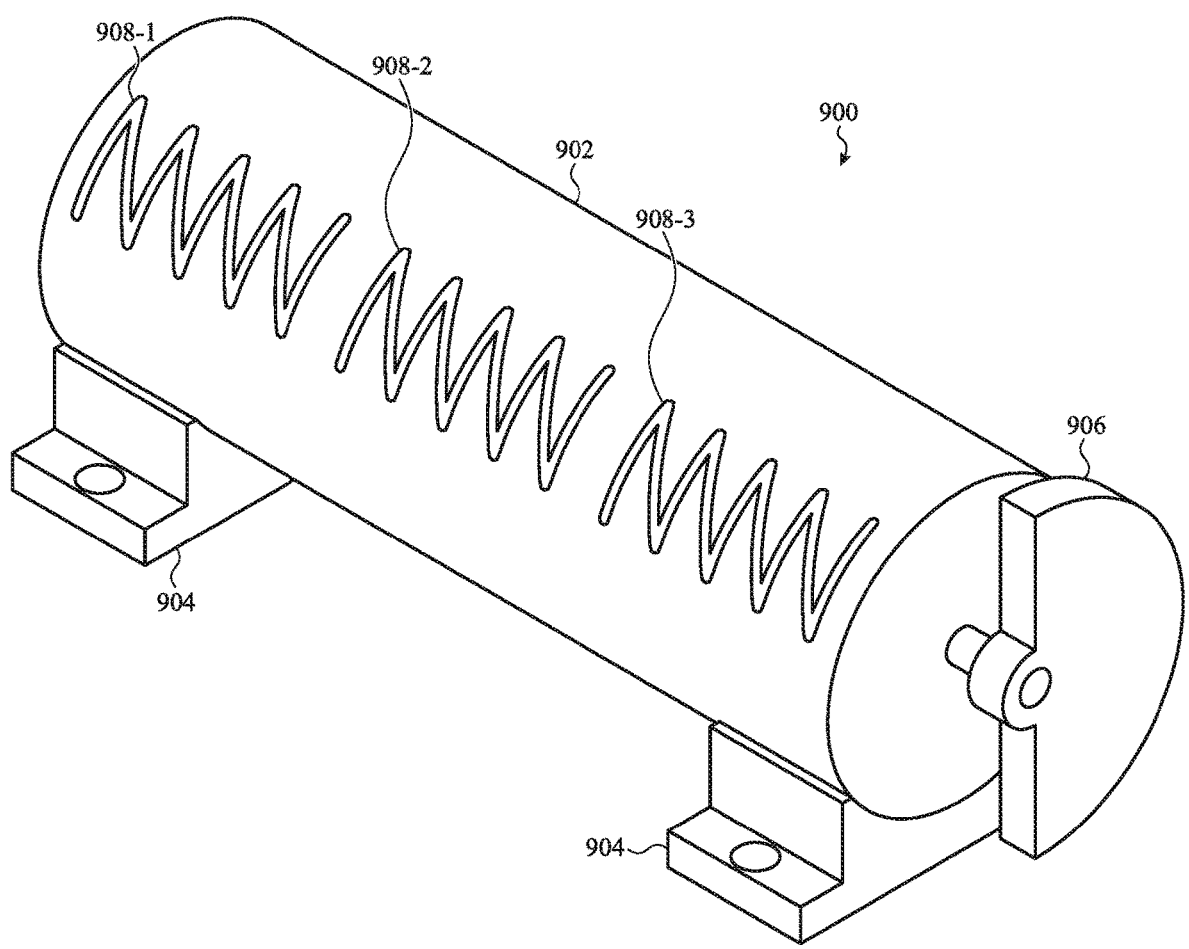
FIG. 9 depicts an example configuration of a rotary haptic actuator.

FIG. 9 depicts an example rotary haptic actuator 900 that may include one or more tuning features that are configured to reduce or attenuate a subset of the frequencies in a vibrational response of the haptic actuator 900. The haptic actuator 900 may include a housing 902 and an eccentric (e.g., unbalanced) mass 906 coupled to a shaft of the haptic actuator 900. The housing 902 may enclose or be a functional part of a motor that causes the eccentric mass 906 to spin relative to the housing 902. The motor may be any suitable motor, such as a brushed direct-current motor, a brushless motor, a servo, a piezoelectric motor, or the like.

The haptic actuator 900 may be configured to rotate the eccentric mass 906 to cause a vibration that may be transferred to another component or device via mounting features 904. For example, the haptic actuator 900 may be coupled to an electronic device (e.g., a battery, enclosure, circuit board, or other component of an electronic device), and when the eccentric mass 906 is rotated, the vibrations may be transmitted to the electronic device to produce a haptic output.

When rotating to produce a haptic output, the haptic actuator 900 may produce a vibrational response. Like the linear haptic actuators described above, the overall vibrational response may be a result of the force impulses produced by the rotation of the eccentric mass 906, friction from bearings or bushings or other contacting parts, harmonics of the overall actuator structure, or the like. Without tuning features, the vibrational response of the haptic actuator 900 may be correspond to a volume vs. frequency plot such as that shown in FIG. 2B. For example, the vibrational response may include a component within a frequency range to which human hearing is particularly sensitive. Accordingly, the haptic actuator 900 may include one or more tuning features 908 that reduce or attenuate that particular component of the vibrational response (e.g., frequencies between about 1 kHz and about 5 kHz), but that do not substantially reduce or attenuate other components of the vibrational response.

The tuning features 908 may be substantially similar in structure and function to those described above. For example, the tuning features 908 may be recesses or protrusions formed in an exterior surface of the housing 902. In some cases, the tuning features 908 may be openings that extend through the housing 902 from an exterior surface of the housing to an interior surface of the housing. As yet another example, the tuning features may include multiple small recesses or through-holes that are arranged in regular patterns to form arrays (e.g., grids) or other shapes (e.g., circles, x-shapes, zig-zags, squares, or the like).

The tuning feature 908 of a rotating haptic actuator may operate in substantially the same way as those in a linear actuator, and may thus provide similar audible-frequency attenuation. For example, the tuning features 908 may reduce the amplitude or apparent volume of a subset of the frequencies of the overall vibrational response of the haptic actuator 900. More particularly, they may attenuate frequencies between about 1 kHz and about 5 kHz by about 8-12 dBA. Furthermore, the tuning features 908 may achieve such attenuation without substantially attenuating other frequencies in the overall vibrational response (e.g., frequencies below about 1 kHz and/or above about 5 kHz). For example, frequencies outside of the targeted range may be attenuated by less than about 5 dBA, individually and/or on average.

The tuning features 908 may achieve such attenuation in the same or similar manner as described above in conjunction with linear actuators. For example, the tuning features 908 may change the fundamental frequency of the housing 902, and thus change how the housing 902 resonates when the mass 906 is being rotated (e.g., when the actuator 900 is producing a haptic output). The tuning features 908 may also or instead disrupt the propagation of mechanical waves or vibrations through the material of the housing 902, thus changing the extent to which certain frequencies can travel, resonate, or become amplified in the material of the housing 902. Other phenomena may also contribute to the particular effect of the tuning features 908 on haptic outputs.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. An electronic device, comprising:
    an enclosure;
    a display positioned with the enclosure and defining a front face of the electronic device; and
    a haptic actuator positioned within the enclosure and comprising:
        a housing comprising a wall having a thickness between about 100 microns and about 500 microns;
        a movable mass positioned within the housing and configured to move within the housing to cause the haptic actuator to produce a vibrational response including:
            a first component within a frequency range; and
            a second component outside of the frequency range and providing a haptic output portion of the vibrational response; and
        a tuning feature incorporated with the wall and configured to reduce the first component of the vibrational response while substantially maintaining the haptic output portion of the vibrational response, the tuning feature defined by a recess having a depth between about 5 microns and about 10 microns into the wall.

2. The electronic device of claim 1, wherein:
    the movable mass is movably coupled to the housing via an elastic member; and
    the movable mass is configured to move substantially linearly along a direction that is substantially parallel to the wall.

3. The electronic device of claim 1, wherein the frequency range is from about 1 kHz to about 5 kHz.

4. The electronic device of claim 3, wherein the second component of the vibrational response is below about 1 kHz.

5. The electronic device of claim 3, wherein the tuning feature is configured to reduce the first component of the vibrational response by about 10 dBA as compared to a haptic actuator without the tuning feature.

6. An electronic device, comprising:
    an enclosure;
    a display positioned with the enclosure and defining a front face of the electronic device; and
    a haptic actuator comprising:
        a housing comprising a wall;
        a movable mass positioned within the housing and configured to move relative to the housing to impart a force on the housing, thereby causing the haptic actuator to produce a haptic output that is part of a vibrational response of the haptic actuator; and
        a channel formed in an exterior surface of the wall and comprising a first portion extending along a first direction and a second portion extending along a second direction different than the first direction, the channel having a width between about 100 microns and about 2.0 mm.

7. The electronic device of claim 6, wherein the channel is configured to reduce an amplitude of a subset of frequencies present in the vibrational response while substantially maintaining the haptic output.

8. The electronic device of claim 6, wherein the wall defines at least two additional channels.

9. The electronic device of claim 6, wherein the channel is defined by a pair of opposing sidewalls having scalloped surfaces.

10. The electronic device of claim 6, wherein:
    a first surface of the wall faces the movable mass; and
    the channel is laser etched into a second surface of the wall that is opposite the first surface.

11. An electronic device, comprising:
    an enclosure;

a display positioned with the enclosure and defining a front face of the electronic device; and a haptic actuator attached to an internal structure of the electronic device and configured to produce a vibrational response including at least an audible first component within a frequency range between about 1 kHz and about 5 kHz and a haptic second component below about 1 kHz, the haptic actuator comprising:

a movable mass; and a housing at least partially enclosing the movable mass and comprising a tuning feature configured to attenuate the audible first component of the vibrational response.

12. The electronic device of claim 11, wherein:
the housing comprises a wall defining an exterior surface of the housing; and
the tuning feature comprises a protrusion extending from the exterior surface.

13. The electronic device of claim 11, wherein:
the housing comprises a wall defining an exterior surface of the housing; and
the tuning feature comprises a plate secured to the exterior surface.

14. The electronic device of claim 13, wherein:
the plate comprises metal; and
the plate is secured to the exterior surface with an adhesive layer between the plate and the exterior surface.

15. The electronic device of claim 11, wherein:
the housing comprises a wall defining an exterior surface of the housing;
the tuning feature comprises a recess in the exterior surface; and
the electronic device further comprises a layer between and in contact with the exterior surface and the internal structure.

16. The electronic device of claim 11, wherein the tuning feature is configured to reduce the audible first component of the vibrational response without substantially reducing the haptic second component of the vibrational response.

17. The electronic device of claim 11, wherein:
the housing comprises a wall having a thickness between about 100 microns and about 500 microns; and
the tuning feature is at least partially defined by a recess having a depth between about 5 microns and about 10 microns into the wall.

18. The electronic device of claim 1, wherein the recess is defined by a pair of opposing sidewalls having scalloped surfaces.

19. The electronic device of claim 6, wherein:
the vibrational response comprises an audio component in a frequency range from about 1 kHz to about 5 kHz; and
the haptic output is below about 1 kHz.

20. The electronic device of claim 19, wherein the channel is configured to reduce the audio component of the vibrational response by about 10 dBA as compared to a haptic actuator without the channel.

* * * * *